United States Patent [19]

Argenbright

[11] 4,416,570

[45] Nov. 22, 1983

[54] PRECISION WORK HOLDER FOR MACHINE TOOLS

[76] Inventor: Carl T. Argenbright, 44 N. Spring St., Shippensburg, Pa. 17257

[21] Appl. No.: 434,529

[22] Filed: Oct. 14, 1982

Related U.S. Application Data

[63] Continuation of Ser. No. 149,569, May 14, 1980, abandoned.

[51] Int. Cl.³ .............................................. B23Q 3/18
[52] U.S. Cl. .................................. 409/222; 409/224; 409/903; 408/71; 279/1 DC; 269/61; 269/67; 269/71; 269/296
[58] Field of Search ..................... 269/58, 59, 61, 63, 269/67, 69–70, 71, 73, 296; 33/174 TD, 174 S; 51/216 A, 216 ND, 237 R; 279/1 DC; 408/71, 106, 122, 122.5; 409/221, 222, 224, 227, 903; 64/30 R, 30 C; 192/46

[56] References Cited

U.S. PATENT DOCUMENTS

| | | | |
|---|---|---|---|
| 1,403,964 | 1/1922 | Knezevich | 408/122 |
| 1,670,253 | 5/1928 | Gilbert et al. | 269/45 |
| 1,875,761 | 9/1932 | Power | 269/45 |
| 2,068,084 | 1/1937 | Stahlhammer | 409/222 |
| 2,203,162 | 6/1940 | Lee | 269/71 X |
| 2,227,443 | 1/1941 | Denner | 409/222 |
| 2,394,175 | 2/1946 | Hill | 269/69 |
| 2,397,086 | 3/1946 | Brady | 409/224 |
| 2,558,055 | 6/1951 | Meredith | 279/1 DC |
| 2,963,946 | 12/1960 | Muench | 269/58 X |
| 3,183,012 | 5/1965 | Watson | 51/237 R |
| 3,412,644 | 11/1968 | Poorman | 409/222 |
| 3,621,753 | 11/1971 | Gladoske | 279/1 DC |
| 3,788,633 | 1/1974 | Cho | 33/174 S X |
| 3,809,196 | 5/1974 | Moribe | 192/46 |
| 3,813,989 | 6/1974 | Janci | 33/174 S X |

FOREIGN PATENT DOCUMENTS 2500638 1/1976 Fed. Rep. of Germany ........ 269/68

*Primary Examiner*—Robert C. Watson
*Attorney, Agent, or Firm*—Schuyler, Banner, Birch, McKie and Beckett

[57] ABSTRACT

A work holder for precision positioning and movement of a workpiece (20) relative to a machine tool comprises a base (100), a pair of spaced stocks (200, 300) mounted on the base, a spindle assemblies (210, 310) supported on each of the stocks for rotation about a common axis, a chuck (246, 346) supported on each of the spindle assembly (210, 310) for clamping the workpiece (20) therebetween, and adjustable mounting means (236–272, 336–372) on each of the spindle assemblies (210, 310) for permitting movement of each of the chucks (246, 346) transversely of the axis. A driveshaft (406) and gearing (402, 408) is provided for imparting rotation to one spindle assembly (210). A crank (422) is operatively connected to the driveshaft (406), and oscillating drive means (416) is providing for oscillating the crank (422) about the driveshaft (406) in two opposite directions. Ratcheting frictional clutch means (424 through 450) is provided for transmitting the motion of the crank (422) to the driveshaft (406) only when the crank (422) moves in one of the two directions. Angular adjustment of the work holder relative to the horizontal is accomplished by inserting gauge blocks (124) of specified height (h) beneath a convex, substantially cylindrical bearing surface at one end of the hinged work holder baseplate (106), the angle of inclination being a function of the height (h) through the sine relationship of height (h) to baseplate length (l).

26 Claims, 15 Drawing Figures

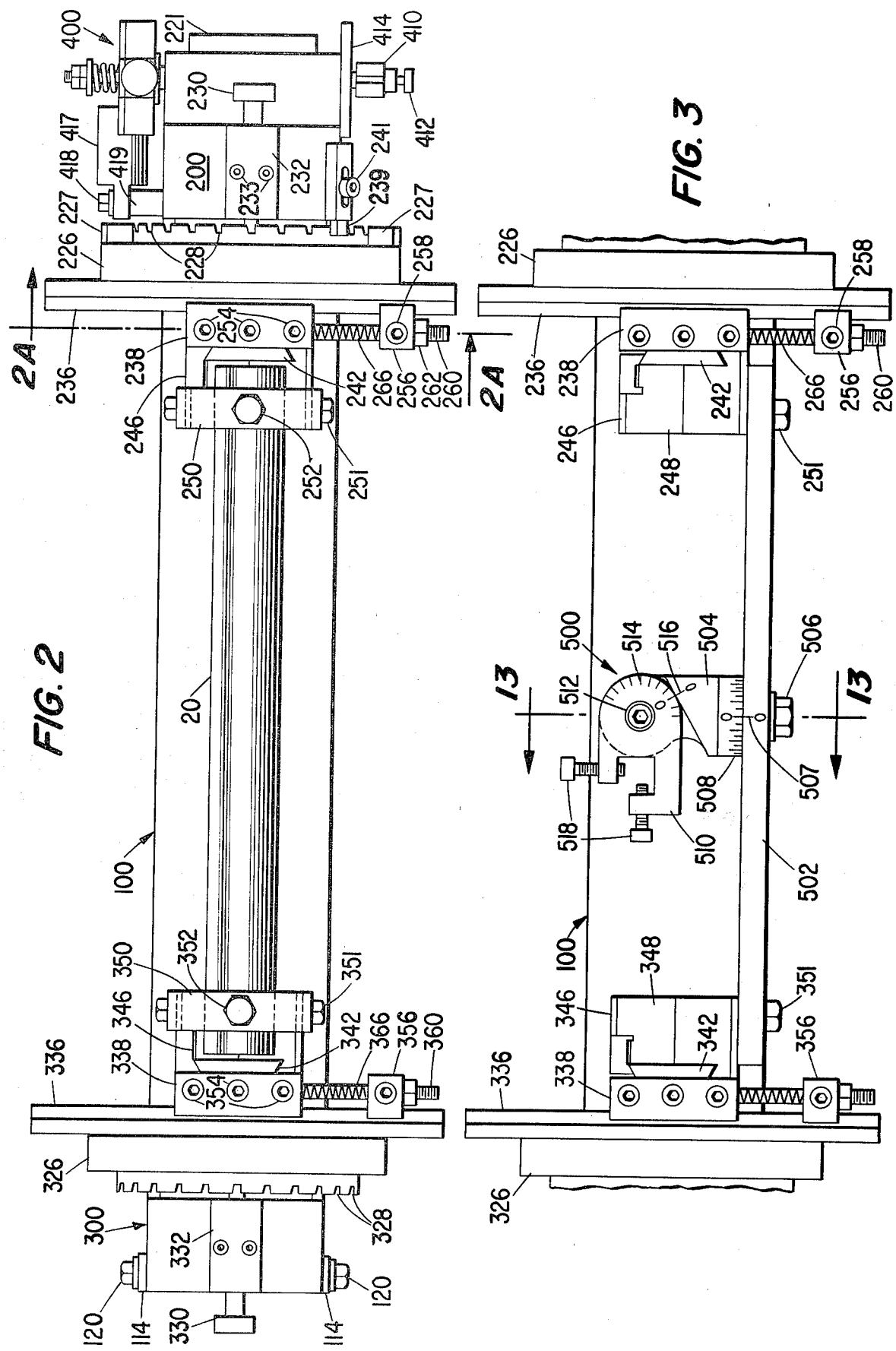

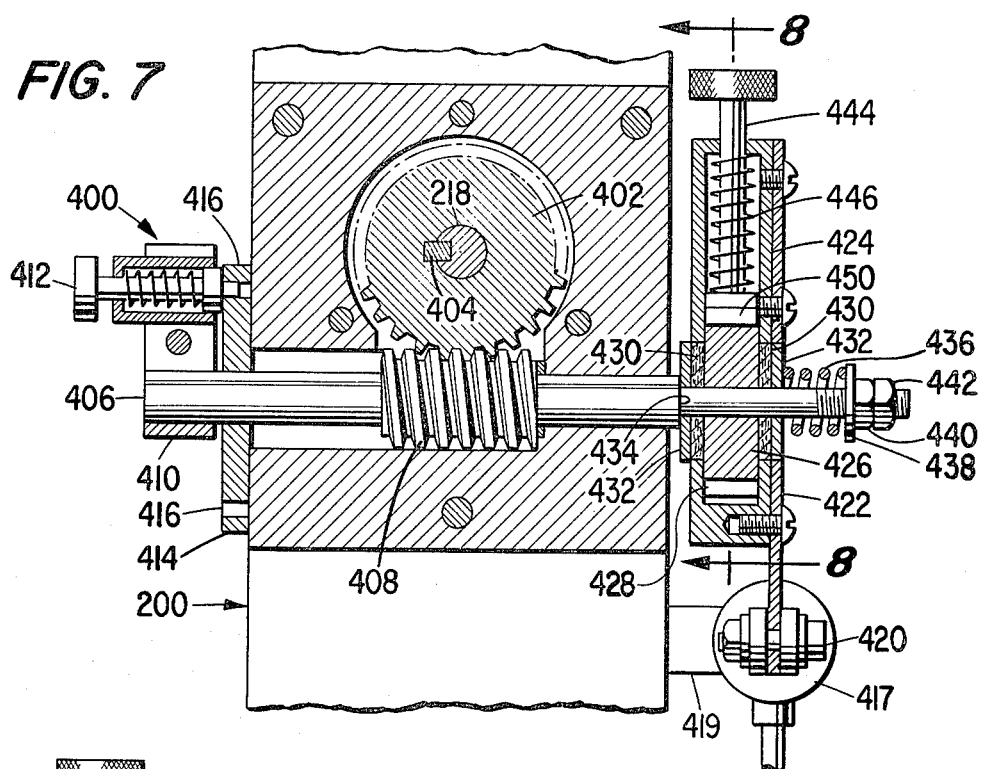
FIG. 7
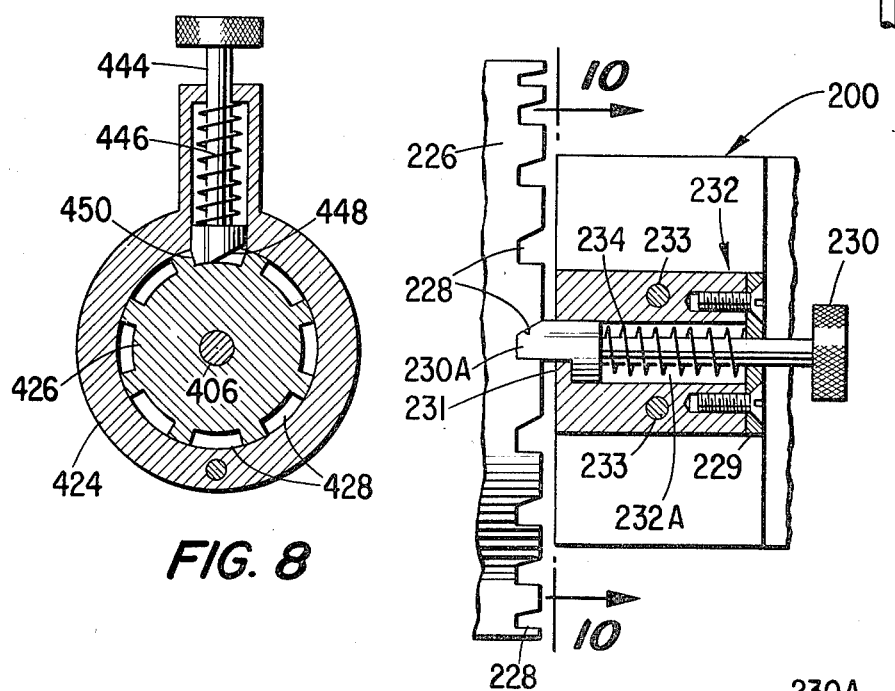
FIG. 8
FIG. 9
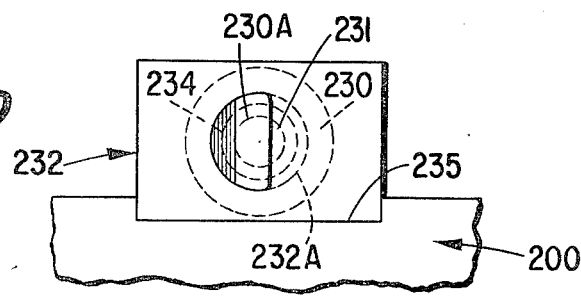
FIG. 10

PRECISION WORK HOLDER FOR MACHINE TOOLS

This application is a continuation of application Ser. No. 149,569, filed May 14, 1980, now abandoned.

TECHNICAL FIELD

The invention relates to work holders and, particularly, to precision work holders for accurately positioning and moving a workpiece relative to a machine tool.

In the precision machining of workpieces using grinders, cutters or other machine tools, it is extremely important that the workpiece be precisely positioned relative to the machine tool. Where the shaping operation requires that the workpiece be moved during shaping, precision movement of the workpiece in the work holder also is important. The ability to quickly insert and accurately position a workpiece is essential to efficient production.

BACKGROUND ART

Existing work holders for machine tools either do not afford the machinist sufficient flexibility in generating a wide variety of shaped workpieces, or are so complex and expensive, as in the case of computerized, numerically-controlled machine tools, as to be unaffordable by all but the more sophisticated machining establishments. The simpler work holders in most instances require considerable time and effort in clamping and accurately aligning the workpiece relative to the machine tool so that a precision surface can be generated. This disadvantage has been overcome, but only to a limited extent, by the fixture disclosed in U.S. Pat. No. 4,012,030, which resiliently holds the workpiece in a spring assembly. This fixture is specifically designed only for limited drilling operations on the workpiece.

Where precise movement of the workpiece during machining is required, tedious manual operation often is necessary. Special, expensive grinding wheels or cutters often are required to generate certain external radii on workpieces supported in prior art work holders.

A need therefore exists in the prior art for a relatively simple, affordable, precision work holder for machine tools which can quickly and precisely position and move a workpiece relative to a machine tool with a minimum of effort and supervision on the part of the machinist, and obviate the need for special grinding wheels and cutters.

DISCLOSURE OF THE INVENTION

In accordance with the present invention, a work holder for precision positioning and movement of a workpiece relative to a machine tool is provided which comprises a base, a pair of spaced stocks mounted on the base, a spindle assembly supported on each of the stocks for rotation about a common axis, a chuck supported on each of the spindle assemblies for clamping the workpiece therebetween, and adjustable mounting means on each of the spindle assemblies for permitting movement of each of the chucks transversely of the axis. The mounting means may comprise a carriage slidable relative to the spindle assembly along a first direction normal to the axis, the chuck being slidable on the carriage along a second direction normal to the axis and to the first direction. Quick and accurate positioning of each chuck is accomplished by spring-biasing the carriage and the chuck against respective adjustable stop members. Direct and indirect indexing means may be provided for locking the spindle assemblies and, hence, the workpiece in precise angular position. Rotation of the workpiece during machining is accomplished by a drive means which incrementally rotates the spindle assembly of one stock (the headstock) either manually or automatically through worm gearing.

The invention also encompasses a work holder for precision positioning and movement of a workpiece relative to a machine tool comprising a rotatably supported spindle assembly, a chuck supported on the spindle assembly for clamping the workpiece, a drive shaft operatively connected to said spindle assembly for imparting rotation thereto, oscillating drive means for generating oscillating motion in two opposite directions, and ratcheting clutch means for transmitting said motion to the drive shaft only in one of the two directions.

The invention further encompasses such a mechanism for converting oscillating motion to intermittent, incremental, unidirectional rotary motion of a shaft, comprising a shoulder on the shaft, a clutch wheel having a notched periphery, rotatably mounted on the shaft, frictional disk means on the shaft abutting the clutch wheel and the shoulder, a compression spring on the shaft urging the disk means and the clutch wheel toward the shoulder, and an asymmetrically beveled, spring-biased ratcheting pin oscillated in the two opposite directions and engaged with the periphery of the clutch wheel.

The invention further encompasses a work holder having adjustable chucking assemblies for positioning a workpiece relative to a machine tool, and an elongated, angularly adjustable base for supporting the chucking assemblies and comprising a bedplate adapted to be supported on a table or other supporting surface, a baseplate substantially coextensive with the bedplate and hinged thereto at one end so that the opposite free end of the baseplate is rotatable in elevation about the hinge, a downwardly facing, convex, substantially cylindrical bearing surface at the free end of the baseplate, the bearing surface supporting the free end of the baseplate on gauge blocks placed on the bedplate for precise angular positioning as a function of the height of the gauge blocks through the sine relationship of gauge block height to baseplate length.

BRIEF DESCRIPTION OF THE DRAWINGS

The details of the invention will be described in connection with the accompanying drawings, in which:

FIG. 2 is a top plan view of the same;

FIG. 3 is a top plan view of the same with an auxiliary chucking attachment secured thereto;

FIG. 7 is a sectional view of the same taken along line 7—7 of FIG. 6, and showing the worm gearing and ratchet drive arrangement;

FIG. 8 is a detail sectional view of the ratchet drive arrangement taken along line 8—8 of FIG. 7;

FIG. 9 is a partial sectional view taken along line 9—9 of FIG. 4 showing the details of a spring-biased direct indexing pin;

FIG. 10 is an end elevation of the index pin and its housing, taken along line 10—10 of FIG. 9;

BEST MODE FOR CARRYING OUT THE INVENTION

Figure 1:
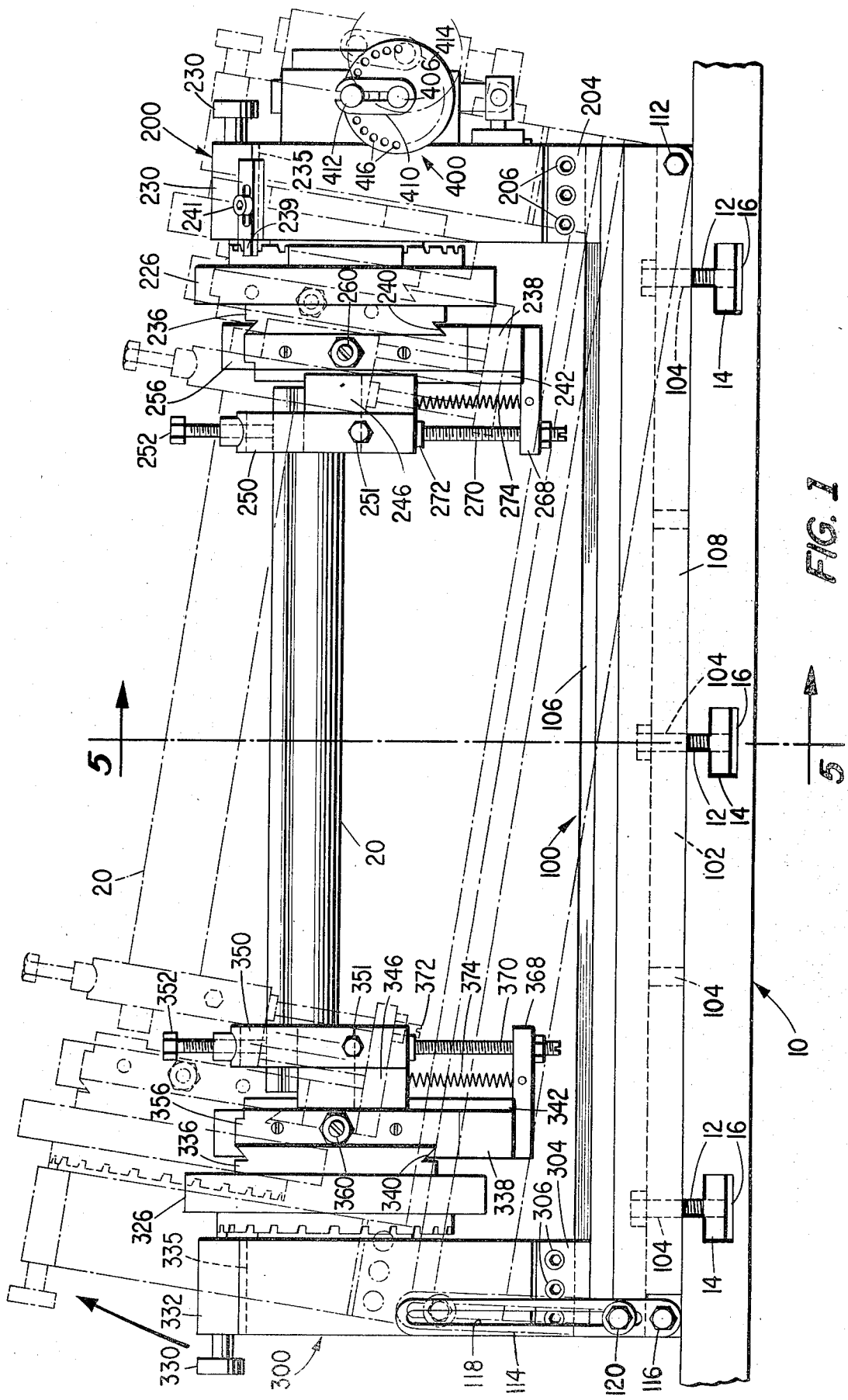
FIG. 1 is a side elevational view of the work holder of the invention, shown also in phantom in an elevated position.

Referring to FIG. 1, the work holder of the invention is adapted to be conventionally secured to the work table 10 of a machine tool, such as a grinder or cutter, by means of bolts 12 threadably received in nuts 14 retained in T-slots 16 in the work table. Alternatively, a magnetic chuck (not shown) may be used to clamp the work holder to Table 10. The work holder is designed to precisely hold and, when necessary, rotate a workpiece 20, shown in the drawings as a piece of cylindrical stock.

Figure 4:
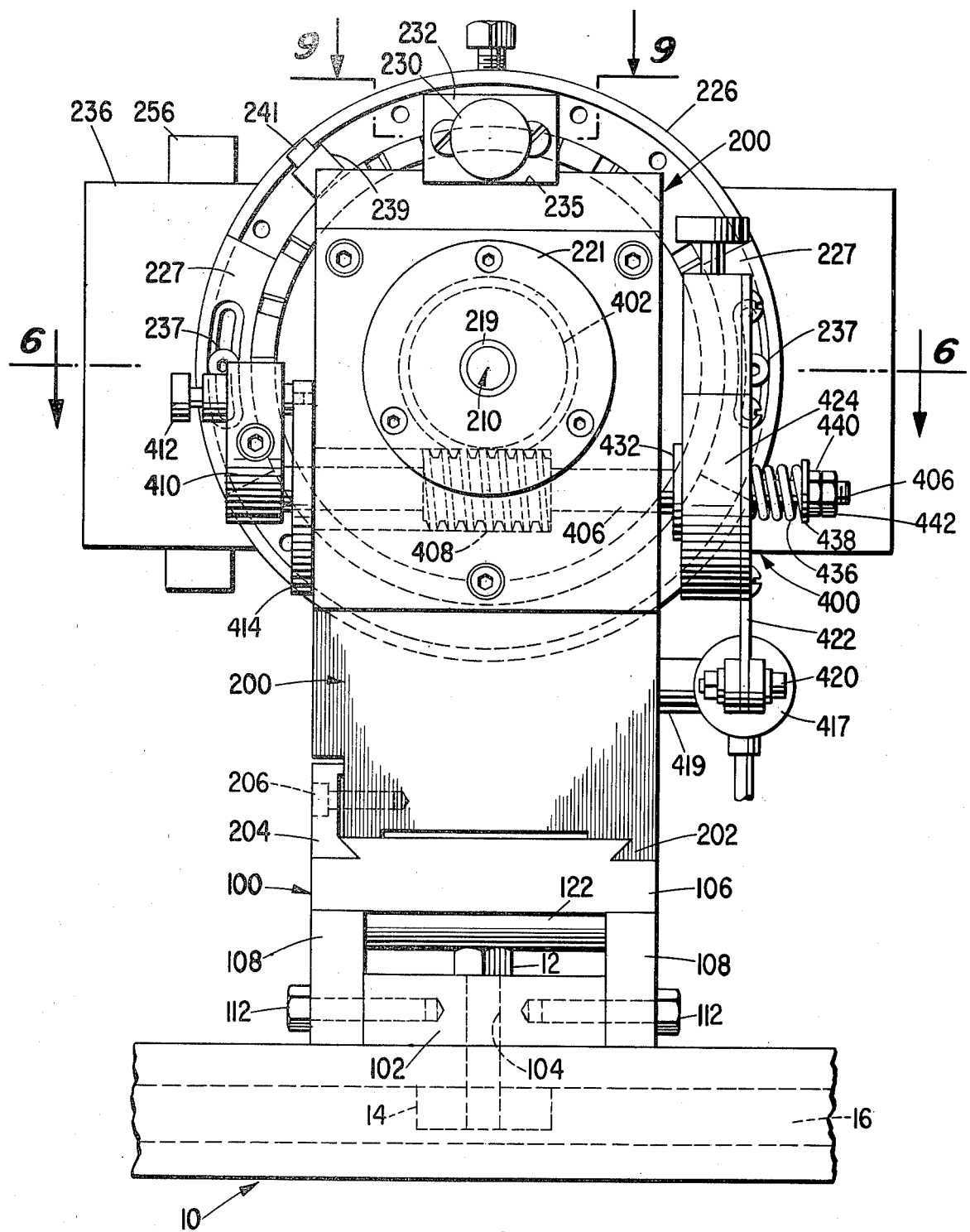
FIG. 4 is an end elevational view of the work holder.
Figure 5:
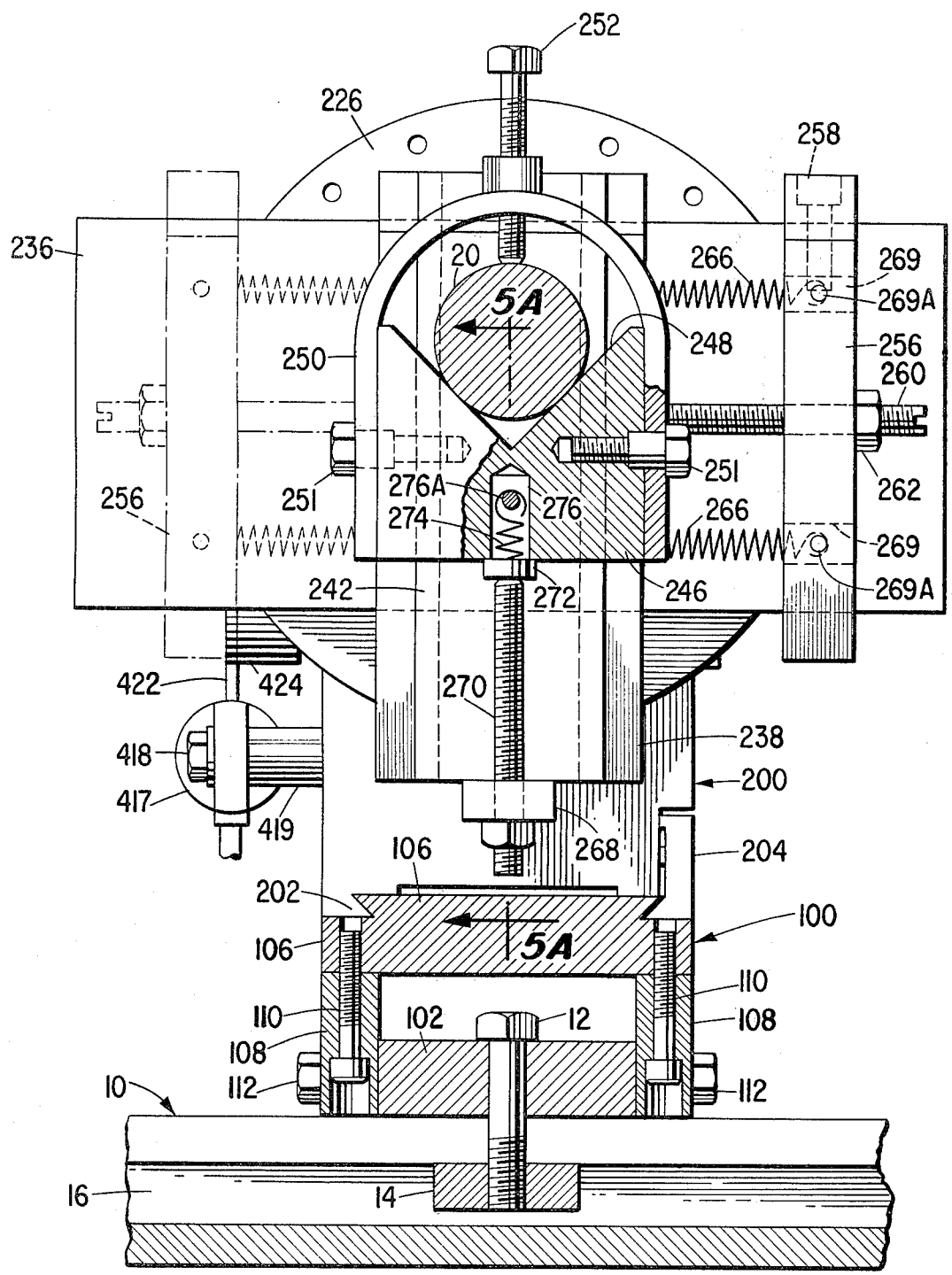
FIG. 5 is a sectional view of the work holder taken along line 5—5 of FIG. 1.

Referring to FIGS. 1, 4 and 5, the base 100 of the work holder comprises a bedplate 102 having spaced holes 104 in which mounting bolts 12 are received. A dovetailed baseplate 106 is bolted to two side members 108 by recessed bolts 110 to form an inverted channel which is hinged at one end to bedplate 102 by means of bolts 112. Slotted struts 114 are bolted to the sides of bedplate 102 by bolts 116. The slotted portions 118 of struts 114 are slidably and clampingly engaged by bolts 120 carried by baseplate 106. When baseplate 106 is elevated about hinge bolts 112 to a desired position, bolts 120 are tightened to rigidly secure baseplate 106 in position.

Figure 11:
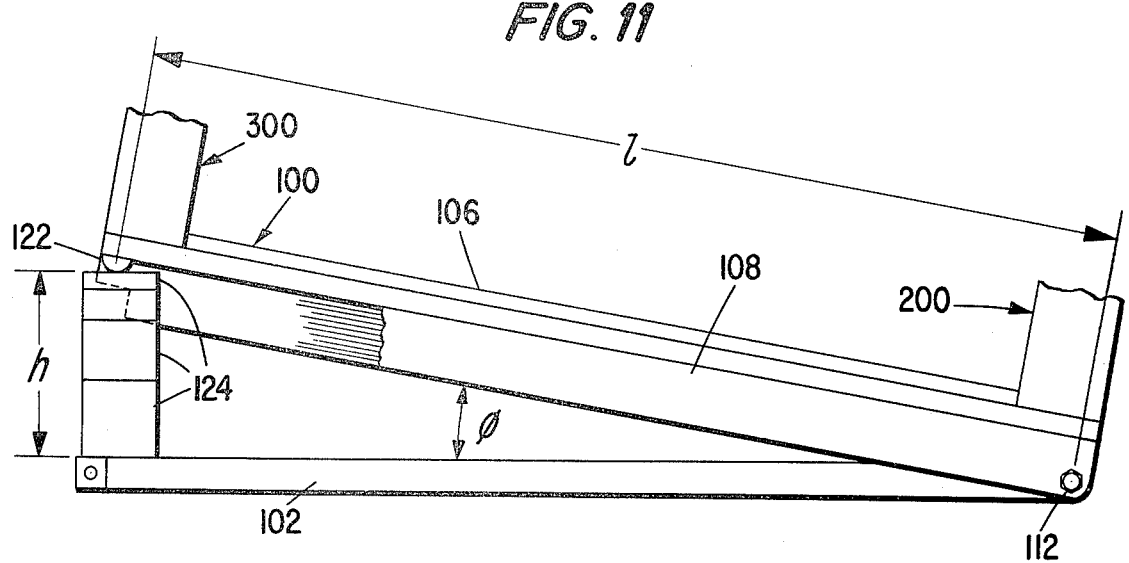
FIG. 11 is a schematic view of the work holder illustrating the geometrical relationship involved in setting the work holder at a specific desired angle of inclination.
Figure 12:
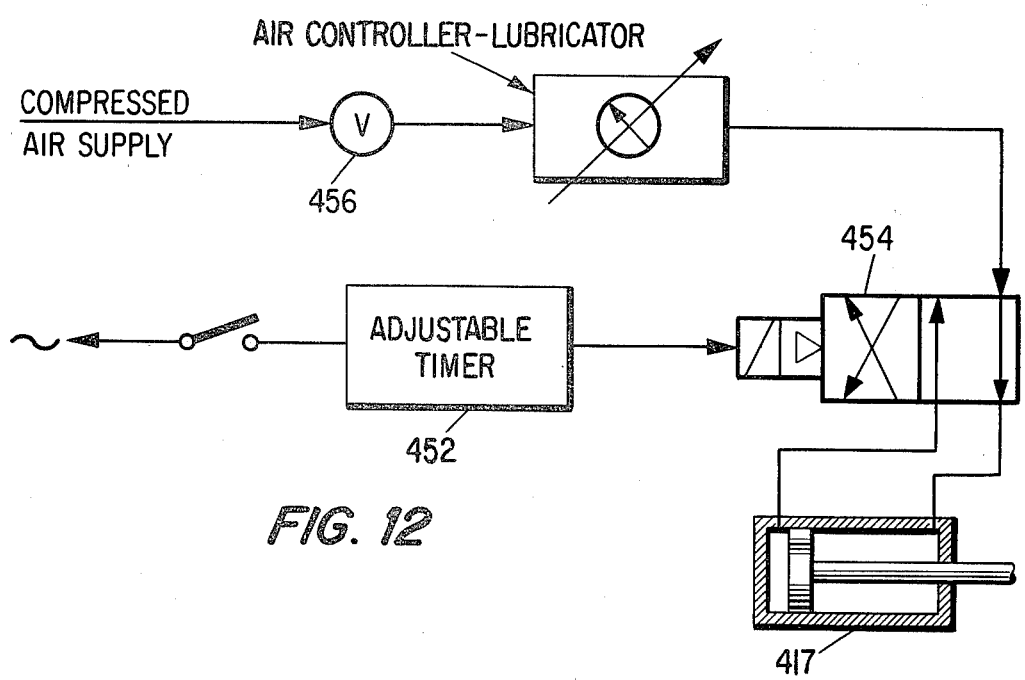
FIG. 12 is a schematic view of the automatic fluid drive means of the work holder.

FIG. 11 illustrates the geometric relationship which enables the machinist to quickly, easily and accurately position baseplate 106 having a length l at a desired angle of inclination $\phi$. A half-round bar 122 is secured to the underside of baseplate 106 by bolts (not shown) to provide a cylindrical bearing surface for supporting baseplate 106. Gauge blocks 124 of selected height h are placed on bedplate 102 and support baseplate 106 by contact with the surface of bar 122. The surface of bar 122 is always substantially tangential to the surface of the uppermost gauge block 124 along their line of contact. This enables baseplate 106 to be firmly supported on gauge blocks 124 without slippage. Owing to the congruence of the right triangle having a vertex at pivot point 112, and the right triangle having a vertex at the point of contact between the half-round bar 122 and the top gauge block 124, the angle of inclination of baseplate 106 is always determined by the relationship:

$$\sin \phi = h/l$$

Hence, for a selected angle of inclination, the machinist need merely insert a number of gauge blocks 124 having a composite height h:

$$h = l \sin \phi$$

Figure 2A:
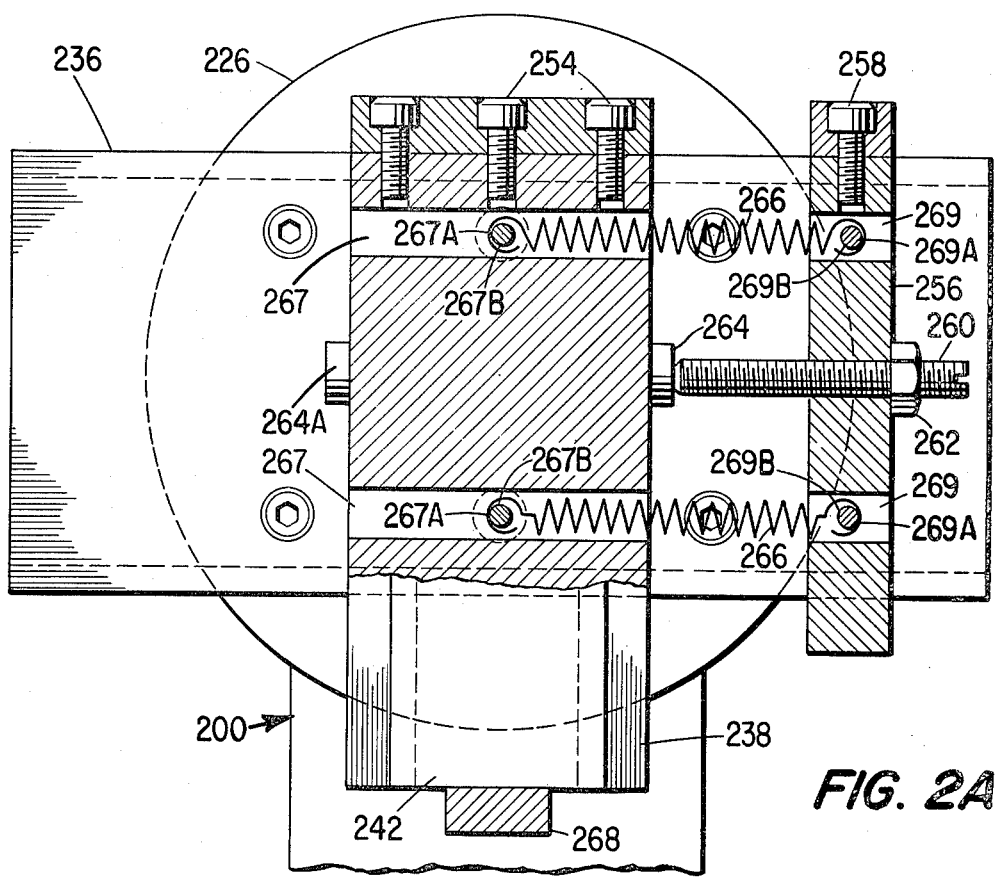
FIG. 2A is a sectional view taken on line 2A—2A of FIG. 2.
Figure 5A:
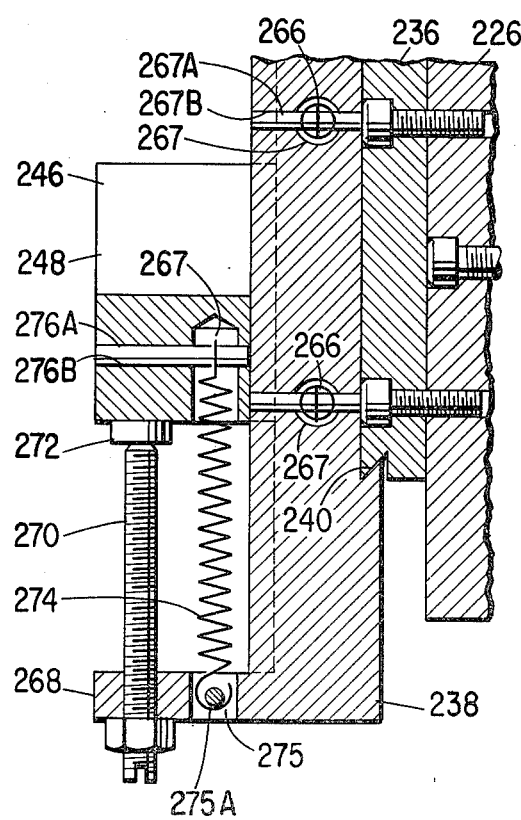
FIG. 5A is a sectional view taken along 5A—5A of FIG. 5, with the workpiece omitted.

Referring to FIGS. 1, 2 and 5, a master control headstock 200 and a slave tailstock 300 are adjustably mounted on baseplate 106. The base of headstock 200 has a dovetailed portion 202 which mates with the dovetailed portion of baseplate 106. A clamping plate 204 locks headstock 200 in position along baseplate 106 when screws 206 are tightened.

Figure 6:
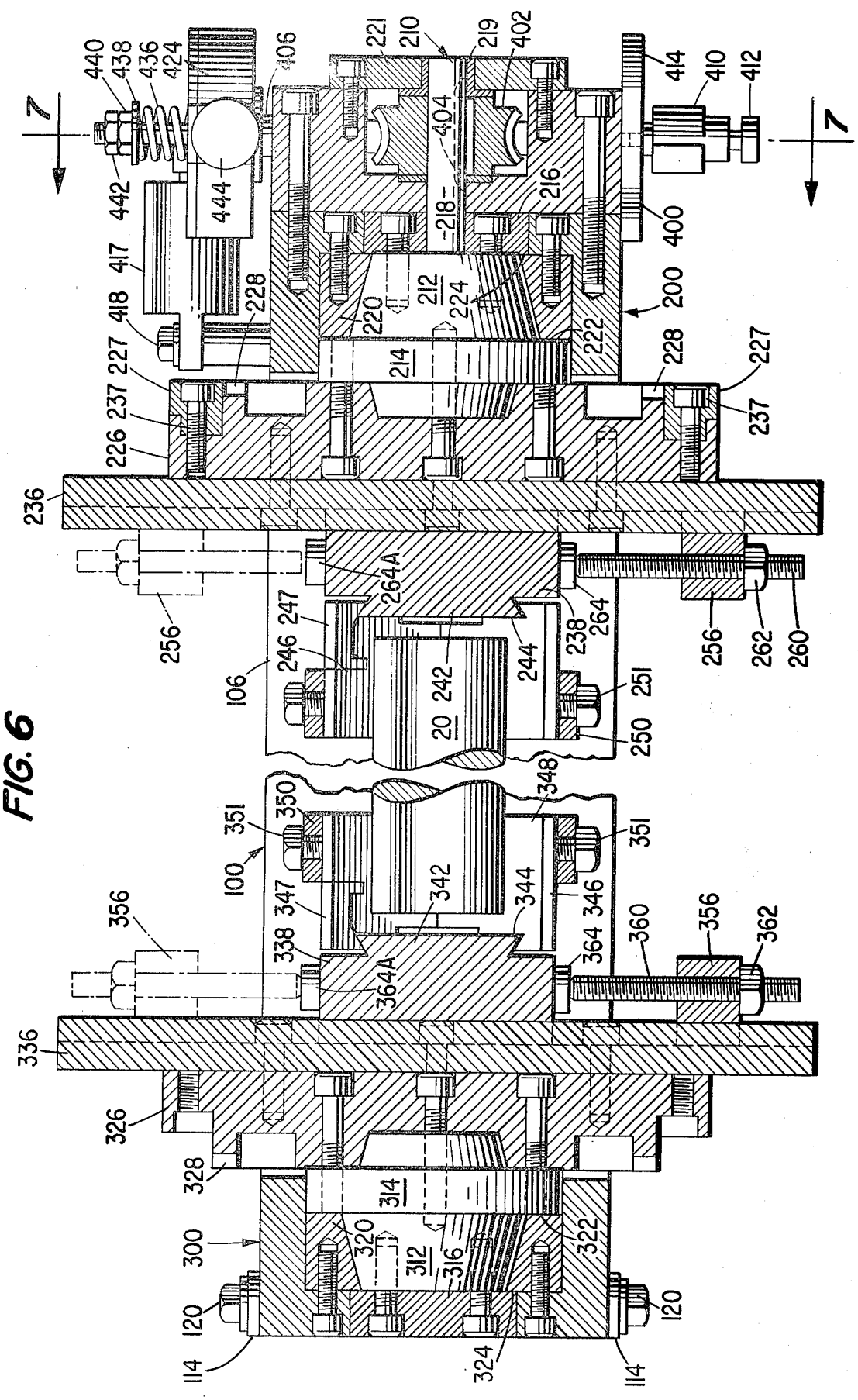
FIG. 6 is a sectional view of the work holder taken along the 6—6 of FIG. 4.

Referring to FIG. 6, a spindle 210 is journalled for rotation in headstock 200. Spindle 200 has an enlarged frustoconical portion 212 flanked by a cylindrical portion 214 and a cap 216 bolted to frustoconical portion 212 and is journalled in bearing 219 supported in end plate 221. A smaller diameter cylindrical portion 218 extends rearwardly from portion 212. Frustoconical portion 212 is journalled in a tapered bearing 220 which is lapped to the highest precision. The shoulders 222 and 224 on the cylindrical and cap portions, respectively, of spindle 210 prevent axial movement of the spindle relative to headstock 200.

A spindle face plate 226 is bolted to spindle 210. The rear surface of spindle face plate 226 has a plurality of uniformly, circumferentially spaced notches 228 (FIGS. 1 and 9) which cooperate with a retractable index pin 230 slidable in a bore 232A in a housing 232 bolted at 233 to headstock 200 in recess 235. Index pin 230 is biased by a spring 234 into engagement with one of the notches 228. This notch and pin arrangement provides direct indexing of the angular position of spindle face plate 226 and, hence, the workpiece 20 supported therein, as described below. A pair of slotted, arcuate stops 227 (FIGS. 4, 6) are adjustably bolted at 237 to the rear of face plate 226. Stops 227 limit the arc of rotation of spindle 210 by engaging a retractable stop pin 239 bolted at 241 to headstock 200.

Index pin 230 may be held in a retracted position by a flange 231 integral with housing 232. To move pin 230 to a retracted position, the pin is pulled back into housing 232 far enough for its tip 230A to clear flange 231, and then rotated 90° so that the tip is stopped and held behind flange 231. The other end of the housing is closed by a plate 229 secured to the housing by suitable screws.

Referring to FIGS. 1, 2, 5 and 6, a dovetailed mounting plate 236 is bolted to spindle face plate 226. A carriage 238 has a mating dovetail groove 240 which enables the carriage to slide along mounting plate 236. Carriage 238 also has a dovetailed projection 242 which is normal to the dovetailed groove 240. Dovetailed projection 242 receives the dovetailed groove 244 of a slidable chuck 246 having a V-groove 248 and an overlying U-clamp 250 bolted to chuck 246 by shoulder bolts 251. A clamping screw 252 is threadably received in U-clamp 250. One end of workpiece 20 is clampingly supported in V-groove 248 when clamping screw 252 is tightened against the workpiece. The two orthogonal degrees of freedom of movement of chuck 246 and carriage 238 enable the workpiece to be freely transversely positioned with respect to the axis of rotation of spindle 210. When positioned as desired, carriage 238 is locked in place by tightening screws 254. Similar locking screws (not shown) through locking shoe 247 are provided for locking chuck 246 in position on carriage 238.

Quick and accurate positioning of chuck 246 is accomplished through the use of adjustable stop mechanisms and springs for carriage 238 and chuck 246. A dovetailed sliding stop bar 256 having a lock screw 258 is slidably and adjustably positionable along mounting plate 236. Stop bar 256 threadably supports a stop screw 260 having a lock nut 262. A stop button 264 is attached to one side of carriage 238. Tension springs 266 connected between stop bar 256 and carriage 238 constantly urge carriage 238 against stop screw 260. Gage blocks can be used between button 264 and screw 260 to accurately position the carriage 238. A stop button 264A is provided on the other side of carriage 238 for the same use when stop bar 256 is moved to the opposite side of carriage 238, as shown by phantom lines in FIGS. 5 and 6.

The mode of attachment of springs 266 to carriage 238 and stop bar 256 affords the broadest possible range of adjustment of carriage 238 by enabling bar 256 to be positioned on either side of carriage 238, and by enabling carriage 238 to actually contact bar 256, if necessary. In this regard, one end of each spring 266 is pinned in a bore 267, extending completely through carriage 238, by a pin 267A retained in hole 267B. The opposite end of each spring is pinned in a bore 269, extending completely through stop bar 256, by a pin 269A retained in hole 269B. Springs 266 can, therefore, extend out of either side of carriage 238 or stop bar 256, allowing bar 256 to be positioned on either side of carriage 238, and carriage 238 and bar 256 can abut one another when stop screw 260 is completely retracted.

A similar arrangement is provided for chuck 246. A stop arm 268, which is an integral portion of carriage 238, threadably supports an adjustable stop screw 270 which bears against a stop button 272 attached to the bottom of chuck 246. A tension spring 274 is pinned at one end in hole 275 by pin 275A, and at the other end in hole 276 by pin 276A retained in hole 276B. Spring 274 constantly urges chuck 246 against stop screw 270. Gage blocks may be used between button 272 and the end of screw 270 to accurately position chuck 246.

Tailstock 300 has a similar arrangement of parts for rotatably supporting the opposite end of workpiece 20. These parts are not described here for the sake of brevity, however, they are labelled in the drawings with numerals in the three hundred series which correspond to the two hundred series numerals designating like parts in headstock 200.

Referring to FIGS. 6–10 and 12, precision drive means 400 are provided for incrementally rotating spindle 210 and, hence, workpiece 20 when desired. A worm wheel 402 is keyed at 404 to the axle portion 218 of spindle 210. A wormshaft 406 is journalled in headstock 200 transversely of spindle 210 and has a worm gear 408 enmeshed with worm wheel 402. A crank 410 is clamped to one end of wormshaft 406 and carries a retractable, spring-biased index pin 412 at its free end. An indexing hole plate 414 is attached to headstock 200 and has a plurality of uniformly, circumferentially spaced index holes 416 (see FIGS. 1 and 7) in which index pin 412 may be engaged. This arrangement provides for indirect and extremely precise indexing of spindle 210 and, hence, workpiece 20. Index pin 412 may be held in a retracted position by a mechanism (not shown) similar to that which can retain index pin 230.

An automatic, powered, incremental drive of spindle 210 is provided at the opposite end of wormshaft 406. A double-acting pneumatic cylinder 417 bolted at 418 to a stud 419 on headstock 200 is shackled at 420 to a crank 422 forming part of a clutch housing 424 surrounding wormshaft 406. The reciprocating motion of the piston in cylinder 417 is converted into an intermittent, incremental, unidirectional rotary motion of wormshaft 406 by a reversible ratcheting frictional clutch mechanism contained within housing 424. This mechanism comprises a clutch wheel 426 having peripherial notches 428. Clutch wheel 426 is supported on wormshaft 406, but is freely rotatable therearound. A composition disk 430 is placed on each side of clutch wheel 426, and a metal disk 432 is placed adjacent each composition disk 430. The left metal disk 432, as seen in FIG. 7, abuts a shoulder 434 formed on wormshaft 406, while the right hand metal disk 432 is urged to the left by a compression spring 436 adjustably held in a compressed state by a washer 438, an adjusting nut 440 and a lock nut 442 threaded on the end of wormshaft 406. A spring-loaded pin 444 is constantly urged by spring 446 into engagement with the periphery of clutch 426. The tip of pin 444 is beveled on one side 448 only, the opposite side 450 being substantially straight.

In operation, when the piston of cylinder unit 417 is withdrawn, crank 422 is pulled, causing housing 424 to rotate counterclockwise as seen in FIG. 8. The straight edge 450 of plunger 444 therefore urges clutch wheel 426 to rotate counterclockwise until the end of the cylinder stroke is reached. Because of the frictional contact between disks 430 and 432 and shoulder 434 of wormshaft 406, wormshaft 406 also will rotate, and thereby rotate spindle 210. When cylinder 416 reverses, housing 424 will be rotated clockwise as seen in FIG. 8. The beveled edge of plunger 444 will then ride up and over the adjacent crest of clutch wheel 426 until the tip of plunger 444 clears the crest, at which point it will snap down into the next succeeding notch 428 in the periphery of clutch wheel 426. Cylinder reversal will again cause clutch wheel 426 and wormshaft 406 to rotate incrementally. Incremental spindle rotation will continue until an arc stop 227 contacts stop pin 239, causing resistance which forces the clutch mechanism to slip. The position of plunger 444 may be reversed by lifting the plunger, turning it 180 degrees and releasing it. This will have the effect of causing wormshaft 406 and, hence, workpiece 20 to rotate in the opposite direction.

The operation of cylinder 417 is controlled by an adjustable timer 452 (see FIG. 12), which governs the operation of a reversible solenoid pilot-operated valve 454. Valve 454 alternately reverses the flow of air through supply valve 456 in a known manner to cause reciprocation of the piston within cylinder 417. Each cycle of cylinder 417 can be synchronized with the operation of the machine tool such that workpiece 20 will be rotated by one increment for each pass of the machine tool. This may be accomplished in a conventional manner known to those skilled in the art, such as by the use of limit switches operated by the motion of the machine tool which send appropriate signals to timer 452.

The above described automatic incremental drive may be replaced by a continuously rotating or stepping motor drive and suitable reversible gearing for smoothly or incrementally rotating wormshaft 406. Such motor and gear drives are conventional and are familiar to those skilled in the art.

Figure 13:
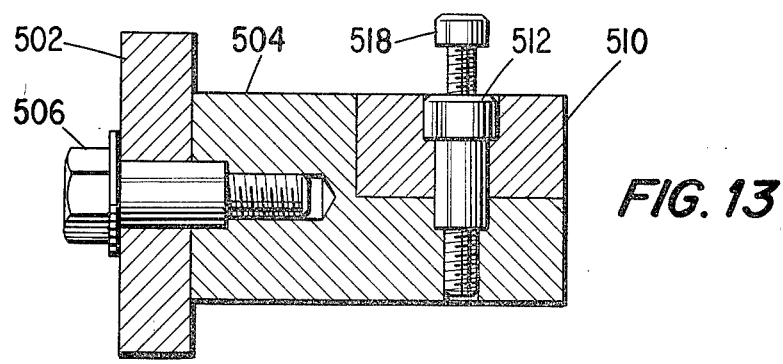
FIG. 13 is a detail sectional view of the auxiliary chucking attachment taken along line 13—13 of FIG. 3.

Referring to FIGS. 3 and 13, an auxillary chucking device 500 for supporting small workpieces may be bolted to the sides of chucks 246 and 346. This chucking device comprises a plate 502 bolted to chucks 246 and 346. A body member 504 is secured to plate 502 by a shoulder bolt 506. An index mark 507 may be provided on the edge of plate 502 adjacent the cylindrical periphery of body member 504. The base of body member 504 is provided with a calibrated angular scale 508 so that the angular position of body member 504 may be suitably adjusted. A head 510 is clampingly and pivotally attached to body member 504 by a shoulder screw 512. A scale 514 and an index mark 516 cooperate to precisely define the angular position of head 510. The axes of rotation of head 510 and body member 504 are orthogonal. Head 510 is provided with a pair of clamping screws 518 for clamping the workpiece.

It is apparent from the foregoing description that the work holder of the invention successfully accomplishes its objectives of quickly and precisely positioning and moving a workpiece at substantially any desired angle relative to a machine tool to generate a machined surface on the workpiece of substantially any desired configuration. It will be obvious to one of ordinary skill that numerous modifications may be made without departing from the true spirit and scope of the invention, which is to be limited only by the appended claims.

I claim:

1. A work holder for precision positioning and movement of a workpiece relative to a machine tool to facilitate the formation of complex surfaces on the workpiece, the work holder comprising:
    a base;
    a pair of spaced stocks mounted on said base, one of said stocks being a headstock and the other of said stocks being a tailstock;
    a headstock spindle assembly supported on said headstock for rotation about an axis;
    drive means for effecting precisely controlled, slow rotation of said headstock spindle assembly about said axis;
    a tailstock spindle assembly supported on said tailstock for free rotation about said axis;
    a chuck supported on each of said spindle assemblies for firmly clamping the workpiece therebetween, said tailstock spindle assembly being rotatable by said drive means through the clamped, rotating workpiece;
    adjustable mounting means on each of said spindle assemblies for permitting synchronous adjusting movement and secure positioning of said chucks relative to said spindle assemblies in two orthogonal directions transverse to said axis when the workpiece is clamped between said chucks and is manually moved for adjustment transversely of said axis; and
    base elevating means for varying the relative heights of the two ends of said base to tilt said axis at a selected angle of inclination.

2. A work holder according to claim 1 wherein each of said spindle assemblies comprises a face plate having a plurality of circumferentially spaced notches, and each of said stocks is provided with a retractable index pin which engages a selected one of said notches to immobilize said spindle assembly and, hence, said workpiece in a selected position.

3. A work holder according to claim 1 wherein said drive means comprises intermittent means for incrementally rotating said headstock spindle assembly.

4. A work holder for precision positioning and movement of a workpiece relative to a machine tool comprising:
    a base;
    a pair of spaced stocks mounted on said base;
    a spindle assembly supported on each of said stocks for rotation about a common axis;
    a chuck supported on each of said spindle assemblies for clamping said workpiece therebetween;
    adjustable mounting means on each of said spindle assemblies for permitting movement of each of said chucks tranversely of said axis, said adjustable mounting means comprising a carriage slidable relative to said spindle assembly along a first normal to said axis, said chuck being slidable on said carriage along a second direction normal to said axis and to said first direction;
    adjustable carriage stop means having a carriage stop surface for resiliently urging said carriage in said first direction against said carriage stop surface; and
    adjustable chuck stop means having a chuck stop surface for resiliently urging said chuck in said second direction against said chuck stop surface.

5. A work holder according to claim 4 wherein each of said mounting means further comprises a mounting plate secured to said spindle assembly, carriage guide means for securing said carriage to said mounting plate and for guiding said carriage along said first direction, and chuck guide means for securing said chuck to said carriage and for guiding said chuck along said second direction.

6. A work holder according to claim 5 wheren said carriage guide means comprises mating dovetailed portions on said mounting plate and on said carriage, and said chuck guide means comprises mating dovetailed portions on said carriage and on said chuck.

7. A work holder according to claim 6 wherein said mounting means further comprises an adjustable carriage stop assembly secured to said mounting plate and having a carriage stop surface and at least one tension spring attached to said carriage for resiliently urging said carriage in said first direction against said carriage stop surface, and an adjustable chuck stop assembly secured to said carriage and having a chuck stop surface and at least one tension spring attached to said chuck for resiliently urging said chuck in said second direction against said chuck stop surface.

8. A work holder according to claim 7 wherein each of said stop assemblies comprises a stop block and a stop screw adjustably threaded in said stop block, said tension spring being attached to said stop block, and the tip of said stop screw forming said stop surface.

9. A work holder according to claim 8 wherein said stop block and said carriage stop assembly is clampingly adjustable and has a dovetailed portion which is slidable along the dovetailed portion of said mounting plate.

10. A work holder for precision positioning and movement of a workpiece relative to a machine tool comprising:
    a base;
    a control headstock mounted on said base;
    a driven spindle assembly supported on said headstock for rotation about an axis;
    drive means for positively rotating said driven spindle assembly comprising a wormwheel keyed to said driven spindle assembly, a wormshaft journalled in said headstock transversely of said axis, and a wormgear on said wormshaft meshing with said wormwheel;
    a slave tailstock mounted on said base, spaced from said headstock;

a slave spindle assembly supported on said tailstock for rotation about said axis;

a chuck supported on each of said spindle assemblies for clamping a workpiece therebetween, whereby rotation of said driven spindle assembly rotates said workpiece and said slave spindle assembly; and adjustable mounting means on each of said spindle assemblies for permitting movement of each of said chucks transversely of said axis.

11. A work holder according to claim 10 wherein said drive means further comprises a crank at one end of said wormshaft.

12. A work holder according to claim 11 wherein said drive means further comprises a retractable index pin at the free end of said crank, and an indexing plate having circumferentially spaced index holes attached to said headstock centrally of said wormshaft, said index pin engageable in a selected one of said index holes to immobilize said driven spindle assembly and, hence, said workpiece in a selected position.

13. A work holder according to claim 11 wherein said drive means further comprises intermittent means for incrementally rotating said wormshaft and, hence, said workpiece.

14. A work holder according to claim 13 wherein said intermittent means comprises a crank operatively connected to said wormshaft, oscillating means for oscillating said crank about said wormshaft in two opposite directions, and ratcheting frictional clutch means for transmitting the motion of said crank to said wormshaft only when said crank moves in one of said two directions.

15. A work holder according to claim 14 wherein said wormshaft has a shoulder and wherein said clutch means comprises:

a clutch wheel having a notched periphery, rotatably mounted on said wormshaft;

frictional disk means on said wormshaft abutting said clutch wheel and said shoulder;

a compression spring on said wormshaft urging said disk means and said clutch wheel toward said shoulder; and an asymmetrically beveled, spring-biased ratcheting pin carried by said crank and engaged with the periphery of said clutch wheel to rotate said clutch wheel in one direction when said pin is engaged in one of said notches and said crank moves in a direction to urge the non-beveled side of said pin against said clutch wheel, and to ride up and over a crest between notches and into the next succeeding notch when said crank moves in the opposite direction to urge the beveled side of said pin against said clutch wheel.

16. A work holder according to claim 15 wherein said oscillating means comprises a reversible, fluid-actuated cylinder coupled to said crank.

17. A work holder according to claim 15 wherein the end of said wormshaft adjacent said compression spring is threaded, and a nut on said wormshaft adjustably compresses said spring to vary the frictional driving force between said disk means, shoulder and clutch wheel.

18. A work holder according to claim 14 wherein said oscillating means is synchronized with the operation of said machine tool so that said wormshaft undergoes one increment of rotation for each stroke of the machine tool.

19. A work holder for precison positioning and movement of a workpiece relative to a machine tool comprising:

a base;

a pair of spaced stocks mounted on said base;

a spindle assembly supported on each of said stocks for rotation about a common axis;

a chuck supported on each of said spindle assemblies for clamping said workpiece therebetween;

adjustable mounting means on each of said spindle assemblies for permitting movement of each of said chucks transversely of said axis;

an auxiliary work holding bar supported on said chucks; and an auxiliary adjustable chucking means secured to said bar for precision clamping of small workpieces.

20. A work holder for precision positioning and movement of a workpiece relative to a machine tool, comprising:

a rotatably supported spindle assembly;

a chuck supported on said spindle assembly for clamping said workpiece;

a driveshaft, having a shoulder, operatively connected to said spindle assembly for imparting rotation thereto;

oscillating drive means for generating oscillating motion in two opposite directions; and ratcheting clutch means for transmitting said motion to said driveshaft only in one of said two directions, comprising:

a clutch wheel having a notched periphery, rotatably mounted on said driveshaft;

frictional disk means on said driveshaft abutting said clutch wheel and said shoulder;

a compression spring on said driveshaft urging said disk means and said clutch wheel toward said shoulder; and an asymmetrically beveled, spring-biased ratcheting pin carried by said crank and engaged with the periphery of said clutch wheel to rotate said clutch wheel in one direction when said pin is engaged in one of said notches and said crank moves in a direction to urge the non-beveled side of said pin against said clutch wheel, and to ride up and over a crest between notches and into the next succeeding notch when said crank moves in the opposite direction to urge the beveled side of said pin against said clutch wheel.

21. A work holder according to claim 20 wherein said oscillating drive means comprises a reversible, fluid-actuated cylinder coupled to said crank.

22. A work holder according to claim 20 wherein the end of said driveshaft adjacent said compression spring is threaded, and a nut on said driveshaft adjustably compresses said spring to vary the frictional driving force between said disk means, shoulder and clutch wheel.

23. A mechanism for converting oscillating motion in two opposite directions to intermittent, incremental, unidirectional rotary motion of a shaft, comprising:

a shoulder on said shaft;

a clutch wheel having a notched periphery, rotatably mounted on said shaft;

frictional disk means on said shaft abutting said clutch wheel and said shoulder;

a compression spring on said shaft urging said disk means and said clutch wheel toward said shoulder; and an asymmetrically beveled, spring-biased ratcheting pin oscillated in said two opposite directions and engaged with the periphery of said clutch wheel to rotate said clutch wheel in one direction when said pin is engaged in one of said notches and said crank moves in a direction to urge the non-beveled side of said pin against said clutch wheel, and to ride up and over a crest between notches and into the next succeeding notch when said crank moves in the opposite direction to urge the beveled side of said pin against said clutch wheel.

24. A mechanism according to claim 23 wherein the end of said shaft adjacent said compression spring is threaded, and a nut on said shaft adjustably compresses said spring to vary the frictional driving force between said disk means, shoulder and clutch wheel.

25. A work holder for precision positioning and movement of a workpiece relative to a stroking machine tool, comprising:
a rotatably supported spindle assembly;
a chuck supported on said spindle assembly for clamping said workpiece;
a driveshaft operatively connected to said spindle assembly for imparting rotation thereto;
oscillating drive means for generating oscillating motion in two opposite directions in synchronization with the operation of said machine tool so that said driveshaft undergoes one increment of rotation for each stroke of said machine tool; and
ratcheting clutch means for transmitting said motion to said driveshaft only in one of said two directions.

26. A work holder for precision positioning and movement of a workpiece relative to a machine tool, comprising:
a rotatably supported spindle assembly;
a chuck supported on said spindle assembly for clamping said workpiece;
a driveshaft operatively connected to said spindle assembly for imparting rotation thereto;
oscillating drive means for generating oscillating motion in two opposite directions; and
ratcheting friction clutch means for transmitting said motion to said driveshaft only in one of said two directions when the resistance to rotation of said driveshaft is below a preset value, and permitting said spindle and said driveshaft to stop rotation while said oscillating drive means continues to generate said oscillating motion when said resistance to rotation exceeds said preset value.

* * * * *